Aug. 26, 1924.  
A. K. HUNTLEY  
DEFERRED ACTION DRY BATTERY  
Filed April 22, 1921
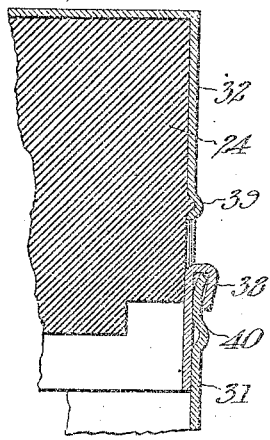
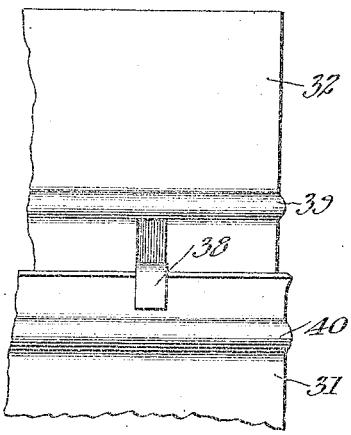
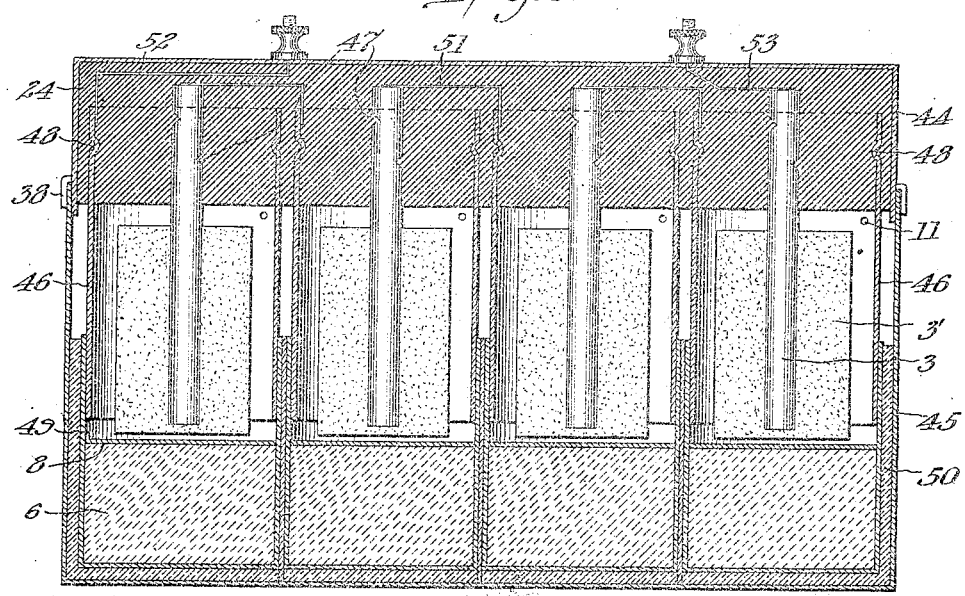

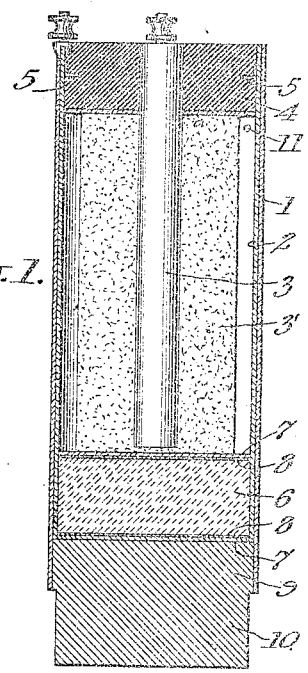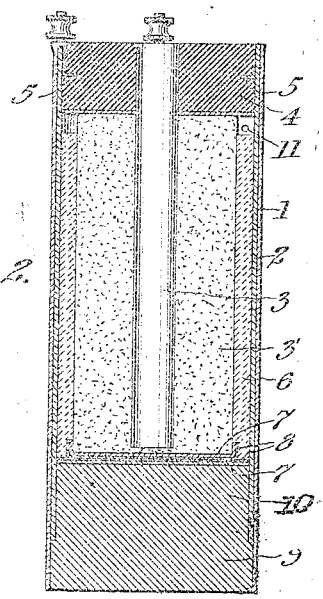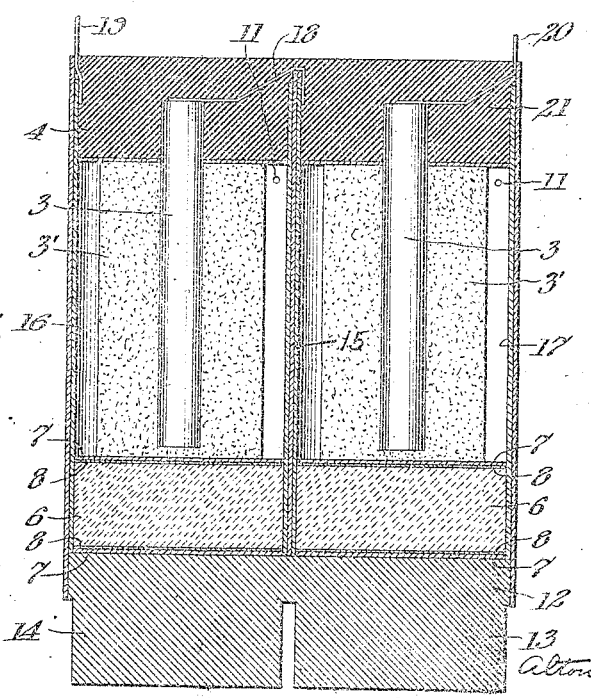

Patented Aug. 26, 1924.

1,506,181

UNITED STATES PATENT OFFICE.

ALTON KARL HUNTLEY, OF MADISON, WISCONSIN, ASSIGNOR TO NATIONAL CARBON COMPANY, INC., A CORPORATION OF NEW YORK.

DEFERRED-ACTION DRY BATTERY.

Application filed April 22, 1921. Serial No. 463,581.

*To all whom it may concern:*

Be it known that I, ALTON K. HUNTLEY, a citizen of the United States, residing at Madison, in the county of Dane and State of Wisconsin, have invented certain new and useful Improvements in Deferred-Action Dry Batteries, of which the following is a specification.

This invention relates to cells of the deferred action type. It comprises, broadly, a cell, or a battery of cells, embodying all the elements necessary for the production of electrical energy, but in which one or both of the electrodes may be retained out of contact with the excitant until it is desired to put the cell or battery into service. One object of my invention is to provide improved means whereby the excitant may be brought into operative relation to the electrodes by a single simple manipulation and relative adjustment of the cell parts.

Further objects and advantages of my invention will appear from the appended full description of preferred embodiments, illustrated in the accompanying drawings, in which—

Fig. 1 is a vertical longitudinal section of a dry cell in inactive condition.

Fig. 2 is a view similar to Fig. 1 showing the bottom member reversed and inserted into the cell to force the excitant into operative relation to the carbon electrode.

Fig. 3 is a vertical longitudinal section through a battery made up of two cells of the type illustrated in Figs. 1 and 2.

Figs. 6 and 7 are, respectively, an enlarged side elevation and vertical section of a form of retaining means for the telescoping sections shown in Fig. 5, and Fig. 8 is a vertical longitudinal section through a four-cell telescoping battery operable in the general manner of that shown in Fig. 5, but in which both electrodes are out of contact with the excitant.

Figure 4:
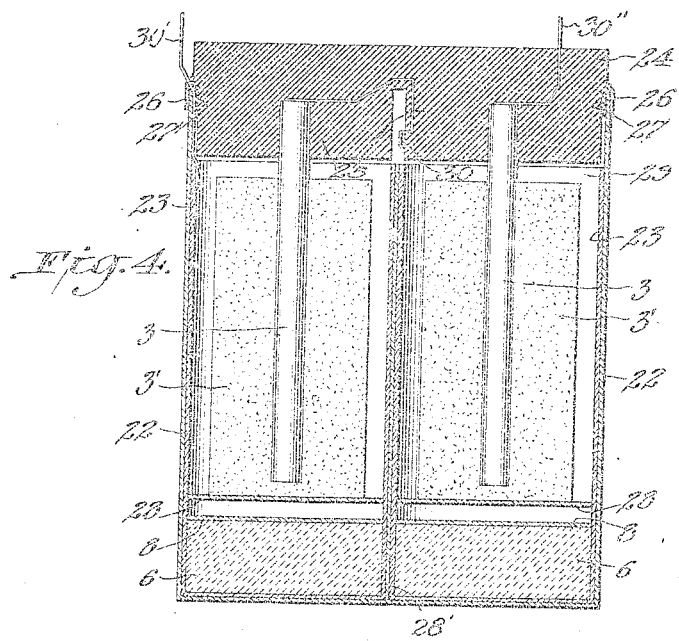
Fig. 4 is a vertical longitudinal section of a two-cell battery in which the carbon electrodes and mix bobbins are retained above the excitant and are adapted to be displaced downwardly.

In the form of the invention shown in Figs. 1 and 2, reference numeral 1 indicates a carton or wrapper, of stiff paper or the like, encircling and extending below the cylindrical zinc shell 2, which serves as one electrode of the cell. The carbon rod 3 carries a mix bobbin 3', forming a cartridge electrode of usual type, and is embedded in a seal 4. A flange 5, or other means for engaging the seal and preventing its slipping downward in the cell, is provided. The mix bobbin may be wrapped or coated if it has not sufficient coherence to be safely used without such reinforcement. The excitant 6, contained in the lower part of the zinc shell, is preferably a paste of the composition and consistency generally used in dry cells, but any excitant which is not too viscous to be forced into operative position, as hereinafter described, may be used. The paste reservoir is closed at each end by a paper disc 7 and a layer of waterproof and evaporation preventing material 8, such as paraffin, quick drying varnish, or the like. This construction affords an adequate protection against leakage and evaporation.

The lower end of the cell is closed by a plug 9 of such diameter as to fit snugly within the depending end of the carton 1. The plug 9 has a cylindrical extension 10 adapted to enter the zinc shell and to serve as a plunger to force the excitant into operative position. As shown in Fig. 1, in the inactive condition of the cell the plug 9 is held by engagement with the carton and is prevented from being prematurely forced against the excitant by abutting against the lower end of the zinc shell 2.

To activate the cell, the plug 9 is disengaged, reversed, and thrust into the zinc shell. The altitude of the cylinder or plunger 10 is approximately equal to the depth of the paste reservoir. Accordingly, when completely inserted, the plunger displaces all the paste into the annular recess between the mix bobbin and the zinc shell, as shown in Fig. 2.

The upper paper disc 7 and waterproof layer 8, while sufficiently strong and impervious to protect the excitant during the inactive life of the cell, are readily ruptured or torn away from the zinc shell 2 by the insertion of the plunger 10. The excitant paste is forced in a substantially uniform layer between the zinc and the mix bobbin, the air contained in the cell being displaced through perforation 11. The quantity of excitant is so adjusted that it will substantially fill the cell space up to the perforation.

The form of the plunger and its retaining means are obviously susceptible of variation. Any suitable closure which may be operated as a plunger to force the paste into active position will serve. I have found it convenient to mold the plunger from sealing wax or other plastic material, but other materials may be used.

In Fig. 3 is illustrated a battery of two deferred action cells of the type described above. The closure plate 12 has two plungers 13 and 14 which will be used to simultaneously activate both cells of the battery by forcing the excitant about the mix bobbins. A plate 15 of celluloid or other insulating material is interposed between the zinc shells 16 and 17. The cells are connected in series through wire 18, and wire terminals 19 and 20 are brought out through the seal 1. Obviously, the cells may be connected in series or parallel, as desired, by wires embedded in the seal. In this construction, the seal engages the upper ends of the zinc shells and is sustained by them. The method to be followed in activating the battery will be clear from the description given in connection with Figs. 1 and 2.

A modified form of my invention is shown in Fig. 4, in which 22 denotes a paper carton encircling and extending above cylindrical zinc container electrodes 23. The zinc containers are preferably fastened in the carton with adhesive. A seal 24, carrying carbon rods 3 and mix bobbins 3', is provided with dependent cylindrical projections 25 adapted to fit into the ends of the zinc containers. In the inactive condition of the battery, the seal is suspended above the containers by any suitable means, such as adhesive tape 26, bound about the seal and engaging the carton. Sealing material to prevent drying out of the cells may be provided in the form of a washer 27 underlying the adhesive tape. The excitant 6, sufficient in quantity to activate the cells, is contained in the bottom of the zinc containers 23 and has an evaporation preventing seal 8. A spacer 28 of relatively thin, flexible insulating material is attached to the bottom of the mix bobbins 3', to prevent vibration of the bobbins when the battery is handled.

The cells are activated by removing the tape 26 and thrusting the seal 24 downward until it is flush with the upper edge of the carton 22. The descending mix bobbins break the waterproof seal and act as plungers to force the excitant up past the spacers 28 and between the bobbins and zinc containers, the air displaced by the rising excitant escaping between seal 24 and carton 22. When the seal is in lowered position, a spring contact 30 on the cylindrical projection 25 makes contact with the zinc container of one of the cells and forms a conductive path to the carbon pole of the other. The cells are separated by an insulating spacer 28'. External connection may be made through wires 30' and 30''.

Figure 5:
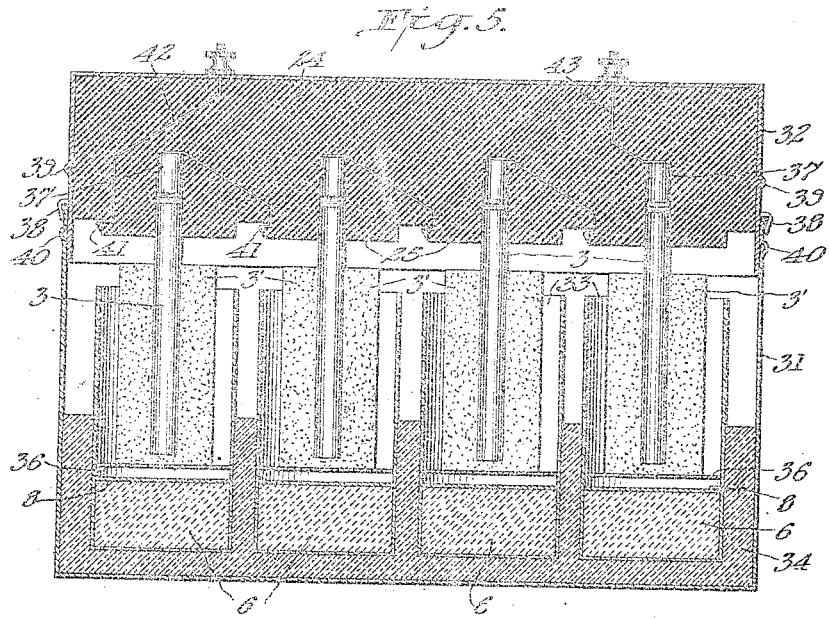
Fig. 5 is a vertical longitudinal section of a four-cell battery comprising telescoping sections.

The form of the invention illustrated in Fig. 5, like that of Fig. 4, has a seal 24 carrying carbon rods with mix bobbins and adapted to be depressed into contact with paste in zinc container electrodes. In the battery shown in Fig. 5, however, a two part telescoping metal casing is provided, comprising the lower section 31 and the upper section 32. Zinc cups 33 are seated in recesses in a layer 34 of pitch or similar material. Each zinc cup contains a sufficient amount of excitant 6 to activate a cell and the excitant is protected by an evaporation preventing layer 8, as previously described. It is desirable to provide spacing rings 36 and to notch or ridge the carbon rods, as at 37, for preventing vibration and consequent loosening of the suspended parts.

The exterior dimensions of the upper section 32 are such as to permit it to slide easily within the lower section 31, and as shown, in the inactive position of the battery the upper section is partly telescoped into the lower. It is held in elevated position by strips or tongues 38, severed on three sides from the upper section and bent down over the edge of the lower section, as shown in detail in Figs. 6 and 7. These strips may be lightly soldered to the lower section to prevent them from being dislodged by handling. A sealing material may be applied about the junction of the sections.

In the upper section 32 is formed an annular rim 39, semicircular in cross section, which is adapted to be sprung into a groove 40 of corresponding contour on the lower section 31. When the sections are telescoped the resilient engagement of the rim and the groove provides a substantially air tight joint. Other means of forming an hermetical seal between the sections may be adopted alternatively or in addition to that described, as for example adjusting the depth of the pitch layer 34 so that the wall of the upper section may be embedded therein when the sections are telescoped. It is advisable to provide corrugations or projections to anchor the seal 24 in the upper section 32; in the construction shown the annular recess formed by rim 39 serves this purpose.

To activate the battery the tongues 38 are detached from the lower section, if they were soldered to it, and are bent upward into their original position in the plane of the upper section walls. The upper section is then pressed down, causing the mix bobbins to displace the excitant upward into the annular spaces between the bobbins and zinc cups, thus simultaneously activating all the cells. Spring contacts 41, connected to the carbon rods, are provided on the cylindrical projections 25, and automatically put the cells into series connection by contacting with the zinc cups when the sections are telescoped. Terminal wires 42 and 43 are connected to binding posts of the usual type. The spring contacts may be connected, if preferable, so as to put the battery into parallel or series parallel connection.

In the modification of the invention shown in Fig. 8, both the zinc and the carbon electrodes are maintained out of contact with the excitant by being suspended from the seal. A container, comprising telescoping sections 44 and 45, has retaining tongues 38 of the type described in connection with Figs. 5, 6 and 7. Zinc shells 46 and carbon rods 3 with mix bobbins 3' are embedded in the seal 24. The shells and rods are preferably ridged as at 47 and 48 to insure a firm connection between the members and the pitch or like material forming the seal. The zinc shells should also extend down a short distance into the paste cups 49 so as to prevent lateral movement. The cups may be of any convenient material, such as water-proofed paper or protected metal or may be mere recesses in the filler 50. A flexible water-proof seal 8 is provided to prevent evaporation from the excitant 6. The cells are shown as joined in series by means of connectors 51, but any form of electrical connection desired may be made by means of conductors embedded in the seal. Terminal wires 52 and 53 lead to the binding posts.

The battery may be activated as described for the form shown in Fig. 5. Air is displaced through perforations 11, when the excitant rises between the bobbins and shells.

In all of the forms of my invention, the excitant is adequately protected against evaporation and premature electrolytic action is prevented, so that the cells may be stored for long periods without deterioration. I have described means for activating a single cell, or a plurality of cells simultaneously, by a simple adjustment of cell or battery parts, in each case causing the excitant to have unimpeded access to the electrodes. Cells activated in this manner give a rapid electrical response and their voltage and amperage is substantially equal to that of the best cells of the non-deferred type.

I claim:

1. A dry battery comprising a plurality of cartridge electrodes, a plurality of zinc electrodes respectively surrounding the same and spaced therefrom, activating material supported out of contact with the cartridge electrodes in the inactive position of the battery, and means for forcing said activating material into operative relation with the electrodes by manipulation of the battery parts.

2. In a battery of dry cells, a plurality of anodes, a cathode adjacent to but out of contact with each anode, a supply of excitant material, and means directly movable along a rectilinear path to force said excitant into operative relation to the anodes and cathodes.

3. In a battery of dry cells, an excitant in contact with the anode of each cell, a cathode in each cell and suspended above said excitant, and means for simultaneously forcing said excitant into operative relation to the cathodes of all the cells.

4. A dry cell comprising a cartridge electrode, a zinc electrode surrounding the same and spaced therefrom, activating material supported out of contact with the cartridge electrode in the inactive position of the cell, and a plunger operable independently of the cartridge electrode and adapted to be manipulated to force the activating material into operative relation with the electrodes.

5. A dry cell comprising a cartridge electrode, a zinc electrode surrounding the same and spaced therefrom, a removable member closing the bottom of the cell and partly extending therefrom, a supply of excitant material in the cell, said removable member being completely insertible in the cell to force the excitant into operative relation to the electrodes.

6. A dry battery comprising a plurality of cartridge electrodes, a plurality of zinc electrodes respectively surrounding the same and spaced therefrom, activating material supported out of contact with the cartridge electrodes in the inactive position of the battery, and means comprising plungers for forcing said activating material into operative relation with the electrodes.

In testimony whereof, I affix my signature.

ALTON KARL HUNTLEY.